(12) United States Patent
Iida et al.

(10) Patent No.: US 6,548,036 B2
(45) Date of Patent: *Apr. 15, 2003

(54) METHOD FOR PRODUCING CARBON BLACK

(75) Inventors: Katsu Iida, Mobara (JP); Mitsuyuki Sasaki, Chiba (JP); Makoto Takahashi, Ichihara (JP); Ryoichi Adachi, Chiba (JP)

(73) Assignee: Cabot Corporation, Boston, MA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 59 days.

(21) Appl. No.: 08/945,687

(22) PCT Filed: May 4, 1995

(86) PCT No.: PCT/US95/05104

§ 371 (c)(1), (2), (4) Date: Jan. 29, 1998

(87) PCT Pub. No.: WO96/34918

PCT Pub. Date: Nov. 7, 1996

(65) Prior Publication Data

US 2001/0055556 A1 Dec. 27, 2001

(51) Int. Cl.⁷ ................................................ C09C 1/50

(52) U.S. Cl. ..................................... 423/449.1; 423/450
(58) Field of Search ............................. 423/449.1, 450, 423/456

(56) References Cited

U.S. PATENT DOCUMENTS

| 3,988,478 A | 10/1976 | Wiggins ...................... 423/445 |
| 4,101,261 A | 7/1978 | Straitz, III ................... 431/202 |
| 4,283,378 A | 8/1981 | Yates et al. .................. 423/456 |
| 4,631,180 A | 12/1986 | Yoshimura et al. .......... 423/450 |
| 5,190,739 A | 3/1993 | MacKay et al. ............. 423/450 |

FOREIGN PATENT DOCUMENTS

| EP | 0 175 328 | 3/1986 |
| GB | 1 217 034 | 12/1970 |
| JP | 53-128974 | 11/1978 |
| JP | 54-7634 | 1/1979 |
| JP | 56-24455 | 9/1981 |
| JP | 3-128974 | 5/1991 |

*Primary Examiner*—Stuart L. Hendrickson

(57) ABSTRACT

A process for producing carbon blacks having lower surface area and structure wherein steam is introduced into the combustion gas stream at a point located a distance "L" from the point of introduction of feedstock into the combustion gas stream such that the ratio L/D ranges from 0 to less than 1.0, where "D" is the diameter of the zone of the reactor at the point of introduction of feedstock.

16 Claims, 1 Drawing Sheet

METHOD FOR PRODUCING CARBON BLACK

This is a National stage application of PCT/US95/05104, filed May 4, 1995.

FIELD OF THE INVENTION

The present invention relates to a novel and improved furnace process for easily and steadily producing carbon blacks having lower specific surface area and structure levels than it is possible to produce in a conventional furnace carbon black process. The carbon blacks produced by the process of the present invention are suitable for various applications including fillers, reinforcing agents and color pigments in rubbers and plastics.

BACKGROUND

In a conventional furnace process for producing carbon black, liquid hydrocarbon feedstock is pyrolyzed by a hot primary combustion gas stream generated from a mixture of fuel and oxidant, such as preheated air or the like, to form an effluent stream. Pyrolysis of the feedstock is stopped by a quench and carbon black products are separated and recovered from the quenched gas stream.

The specific surface area of carbon black produced by furnace process depends, generally, upon decomposition reaction temperature which is controlled by primary combustion gas temperature and the amount of feedstock introduced.

Generally, the specific surface area of carbon black decreases with falling reaction temperature, which decreases with falling primary combustion gas temperature and with an increase in the amount of feedstock introduced. However, temperature of the primary combustion gas cannot be decreased without any limitation, because the primary combustion gas supplies energy for decomposition of the feedstock. Therefore, production of carbon blacks having such a low specific area in furnace process is generally accomplished by increasing the amount of feedstock introduced which leads to a need to shut down the reactor for cleaning as a result of carbon black adhering to the inside of the reactor walls as indicated by low light transmittance of toluene discoloration.

Provided that the amount of feedstock introduced is increased, the amount of carbon black produced per unit volume of the reactor is increased and as a result, promoted coke formation leads to increased grit as an impurity which means deterioration of carbon black quality. In order to resolve this problem, the reaction zone may be expanded but expansion of the reaction zone may lead to a new problem of accumulation of carbon black formed due to slowdown of effluent gas speed in the reactor and also an undesirable economic problem associated with the need for enlarged facilities.

Primary particle diameter of the carbon black is generally dependent upon the reaction temperature. The higher the reaction temperature, the smaller is the primary particle diameter of the carbon black formed. The higher the structure of a carbon black, the lower is the specific area of the carbon black at a given particle size. This means that low structure blacks have higher specific surface area at a given primary particle size than high structure blacks.

Restriction of carbon black structure development is attained in conventional processes by introduction of alkali metals ion into the reactor, but this method generally causes an increase of specific surface area simultaneously with decreasing structure because the primary particle diameter remains generally constant. It will, therefore, be recognized that production of carbon blacks having both low structure and low specific surface area is difficult in heretofore conventional furnace processes.

For the purpose of solving this type of problem, U.S. Pat. No. 5,190,739 gives important suggestions of production method of carbon blacks having both low structure and low specific surface area at a given overall combustion level, which gives an important suggestion to a method for preparing carbon blacks having both low structure and low specific surface area at a given feedstock level introduced. This method is carried out by adding an auxiliary hydrocarbon such as an auxiliary hydrocarbon having high molar hydrogen-to-carbon ratio or hydrogen.

Technology relating to the introduction of water or steam into furnace carbon black reactors is disclosed in U.S. Pat. No. 4,283,378 and U.S. Pat. No. 4,631,180. Technology relating to introduction of water or steam as an improved method for producing carbon black based on furnace process, was also described in Japanese Patent Publication No. Sho54-7634, Japanese Patent Laid Open No. Sho56-24455, and Japanese Patent Laid Open No. Hei 3-128974 etc. All of these inventions generally relate, however, to production of carbon blacks having higher specific surface areas than the carbon blacks produced in a similar manner in the absence of steam activation. Thus, the objective of these inventions is quite different from that of the present invention relating to production of carbon blacks having lower specific surface areas than carbon blacks produced in a similar manner in the absence of steam activation.

Accordingly, an object of the present invention is to develop an improved furnace carbon black process in order to produce easily and steadily carbon blacks having both low specific surface area and low structure which have been regarded as being difficult to produce by conventional furnace process.

SUMMARY OF THE INVENTION

The above-mentioned object, and other advantages are attained by an improved furnace carbon black process featuring restraint both of specific surface area and structure developments by means of introduction of steam at or near the position of introduction of feedstock in furnace carbon black process. According to the process of the present invention, in a furnace carbon black production process comprising introduction of hydrocarbon feedstock, preferably in liquid form, into hot primary combustion gas stream, pyrolysis and quenching, steam is introduced into the combustion gas stream at, or near (upstream or downstream), the point of the injection of the hydrocarbon feedstock into the gas stream such that the ratio L/D (as hereinafter defined) ranges from 0 to less than 1.0.

DETAILED DESCRIPTION OF THE INVENTION

Figure 1:
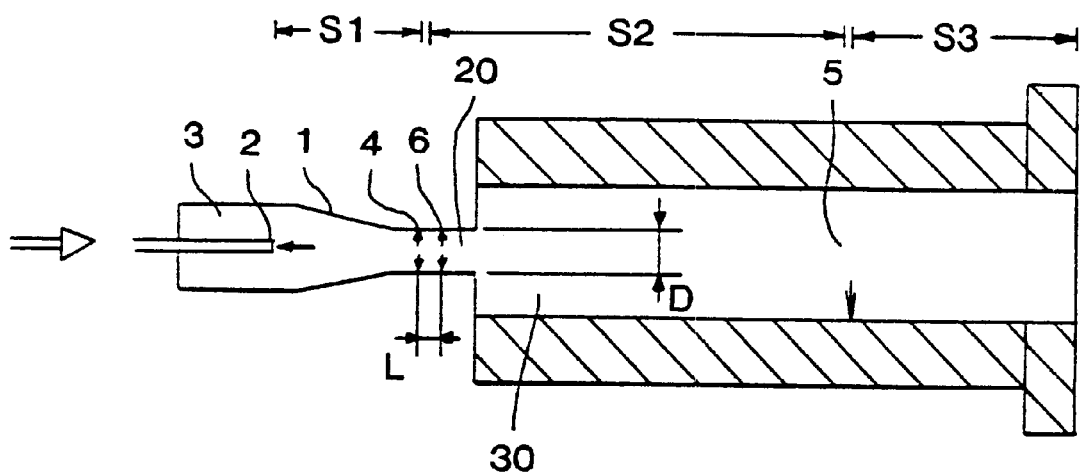
FIG. 1 is a cross-sectional view of a portion of one type of furnace carbon black reactor which may be utilized to perform the process of the present invention.

The present invention may be better understood with reference to FIG. 1 which illustrates one type of furnace carbon black reactor which may be utilized to perform the process of the present invention.

FIG. 1 illustrates a carbon black reactor having combustion zone, 1 where fuel from probe 2, and an oxidant, such as air or the like, circulating in space 3, are reacted to form a hot combustion gas stream. Among the fuels suitable for use in contacting the oxidant stream in combustion zone 1 to generate the hot combustion gases are any of the readily combustible gas, vapor, or liquid streams such as natural gas, hydrogen, carbon monoxide, methane, acetylene, alcohol, or kerosene. It is generally preferred, however, to utilize fuels having a high content of carbon-containing components and in particular, hydrocarbons. The ratio of air to natural gas utilized to produce the carbon blacks of the present invention may preferably be from about 10:1 to about 100:1. To facilitate the generation of hot combustion gases, the oxidant stream may be preheated.

The direction of the flow of hot combustion gases is shown in the FIGURE by the arrow. The hot combustion gas stream travels from zone 1, downstream into a transition zone, 20 having a diameter "D". A liquid hydrocarbon feedstock is introduced at point 4 in zone 20. Suitable for use herein as carbon black-yielding hydrocarbon feedstocks, which are readily volatilizable under the conditions of the reaction, are unsaturated hydrocarbons such as acetylene; olefins such as ethylene, propylene, butylene; aromatics such as benzene, toluene and xylene; certain saturated hydrocarbons; and other hydrocarbons such as kerosenes, naphthalenes, terpenes, ethylene tars, aromatic cycle stocks and the like. Generally, carbon black-yielding feedstock is injected in the form of a plurality of streams which penetrate into the interior regions of the hot combustion gas stream to insure a high rate of mixing and shearing of the hot combustion gases and the carbon black-yielding feedstock so as to rapidly and completely decompose and convert the feedstock to carbon black.

Steam is introduced at point 6 in zone 20, which in FIG. 1 is downstream from the point of feedstock injection 4. "L" is the distance from point 4, upstream or downstream to point 6. When, feedstock and steam are introduced at the same point, L=0 and therefore L/D=0. Although, in the process depicted in FIG. 1, the point of steam introduction is downstream of the point of feedstock introduction, according to the process of the present invention, the point of steam introduction may be located upstream, downstream or at the point of feedstock introduction, provided L/D ranges from 0 to less than 1.0. Preferably, the point of steam introduction is located upstream of the point of feedstock introduction.

After introduction of feedstock and steam the resulting effluent travels downstream into zone 30. Quench 5, located in zone 30 injects a quenching fluid, such as water to stop the reaction when carbon blacks having the desired properties are formed. The location of quench 5 may be determined in any manner known to the art for selecting the position of a quench to stop pyrolysis. One method for determining the position of the quench to stop pyrolysis is by determining the point at which an acceptable toluene extract level for the carbon black is reached. Toluene extract level may be measured by using ASTM Test D 1618-83 "Carbon Black Extractables—Toluene Discoloration".

S1 is the distance from point of fuel introduction through probe 2, to the point of feedstock introduction at point 4. S2 is the distance from the point of feedstock introduction, point 4, to the quench 5. S3 is the distance from quench 5 to the end of zone 30.

After the mixture of hot combustion gases and carbon black-yielding feedstock is quenched, the cooled gases pass downstream into any conventional cooling and separating means whereby the carbon blacks are recovered. The separation of the carbon black from the gas stream is readily accomplished by conventional means such as a precipitator, cyclone separator or bag filter. This separation may be followed by pelletizing using, for example, a wet pelletizer.

As set forth above, in combustion zone 1 of the first section (S1), hot primary combustion gas is generated by mixing and reaction of fuel from probe 2, with oxidant in space 3, such as preheated air or the like. In the second zone (S2) adjacent to the first section, pyrolysis of feedstock, formation of precursor of carbon black and growth of primary particle of carbon black advance, subsequently to the introduction of liquid hydrocarbon feedstock into the primary combustion gas stream. Finally, in the third zone (S3), the effluent is quenched by cooling medium from quench 5 such as water or the like to terminate the reaction and produce carbon black.

We have discovered that steam, introduced from a position, 6, near to or at the position of feedstock introduction, 4, can restrain both specific surface area and structure developments of carbon black formed. More particularly, we have found that the position of introduction of steam is important to restrain both specific surface area and structure developments of carbon black and thus produce carbon black products having lower surface areas and structure than are produced in a similar manner in the absence of steam introduction.

According to the process of the present invention the distance (L) from the position of introduction of feedstock to that of introduction of steam, upstream or downstream, from the position of feedstock introduction must be smaller than diameter (D) of the throat where feedstock is introduced such that L/D ranges from 0 to less than 1.0.

The diameter of the throat into which feedstock is introduced is generally optimized according to intrinsic factor for individual reactor in a furnace carbon black process. Regardless of the shape of the reactor, the same results are obtained in all cases of steam introduction wherein L/D ranges from 0 to less than 1.0.

Where the amount of steam introduced is less than 1% by weight of feedstock introduced, the effect of steam introduction on restraint both of specific surface area and structure of carbon black is slight The degree of restraint of specific surface area and structure development of carbon black is approximately proportional to the increase of steam level introduced. Where an extremely high level of steam is introduced, formation of carbon black itself is restrained by severe obstruction of formation of carbon black precursor due to excessive steam. It is difficult to introduce steam in an amount more than 15% by weight of the feedstock introduced while carrying on the production of carbon black. Therefore in a preferred process of the present invention, the amount of steam introduced into the combustion gas stream ranges from 1 to 15%, by weight, of the amount of feedstock introduced.

The following testing procedures are used in evaluating the analytical and physical properties of the carbon blacks produced in the following Examples.

As measures of specific surface area and structure of carbon black in every actual and contrast examples described herein, data obtained by the following testing procedures are adopted.

Specific Surface Area by Nitrogen Absorption: Based on BET method ($N_2SA$). This was determined in accordance with ASTM D3037 for Example I and Example II.

Iodine Absorption No.: This was determined in accordance with JIS K-6221 for Example I and in accordance with ASTM D1510 for Example II.

DBP (Dibutyl Phthalate) Absorption No.: This was determined in accordance with JIS K-6221 for Example I and in accordance with ASTM D3493 for Example II.

Compressed DBP Absorption No. was determined after compression treatment of four times repeated by 24,000 psi load. This was determined in accordance with ASTM D3493 for Example I.

The effectiveness and advantages of the present invention will be further illustrated by the following examples.

EXAMPLE I

This Example illustrates the process of the present invention wherein L/D is greater than 0, and less than 1.0, in comparison to processes without steam introduction.

Experiments were conducted in a reactor depicted in FIG. 1. Length of the first zone (S1) of reactor is 3000 mm, length of the second zone (S2) is 15000 mm and diameter of throat (D) where feedstock is introduced is 200 mm. Primary properties of fuel and feedstock employed are listed in Table 1. An aqueous solution of potassium ion, for structure control, is added to the feedstock both for actual and contrast examples.

TABLE 1

FUEL AND FEEDSTOCK ADOPTED

|  | FUEL | FEEDSTOCK |
|---|---|---|
| Type | Liquid Hydrocarbon | |
| Density (15° C.) [g/cm³] | 0.970 | 1.057 |
| Viscosity (50° C.) [c St] | 5 | 15 |
| C-atom [wt %] | 89.8 | 91.1 |
| H-atom [wt %] | 10.1 | 8.6 |
| Total Calorific Value [kcal/kg] | 9920 | 11230 |

Data obtained based on actual examples are shown in Table 2 and those on contrast examples in Table 3.

Additionally the specific surface area of a carbon black is dependent upon its structure. There is also a lowest limit of specific surface area of a carbon black produced in a furnace process due to operational limits of the reactor employed. In a furnace process there must, therefore, exist a minimum specific surface area corresponding to a given structure. This minimum specific surface area is designated "Limited Specific Surface Area" hereinafter. The Limited Specific Surface Area value varies according to the different shape of the reactor. In the case of the reactor employed for the actual and contrast examples of Tables 2 and 3, the limit specific surface area is calculated using the following equation (1):

$$[\text{Limited Specific Surface Area}] = 78.5 - 0.748 \times [\text{Compressed DBP}] \quad \text{Equation (1)}$$

where nitrogen surface area data, compressed DBP data and operation conditions adopted were taken into consideration.

TABLE 2

| Actual Examples | | 1 | 2 | 3 | 4 | 5 | 6 |
|---|---|---|---|---|---|---|---|
| Combustion Air Rate | (Nm³/hr) | 3530 | 3530 | 3530 | 3530 | 3530 | 3530 |
| Fuel Rate | (kg/hr) | 80 | 80 | 80 | 80 | 80 | 80 |
| Feedstock Rate | (kg/hr) | 1800 | 1770 | 1800 | 1870 | 1620 | 1590 |
| Potassium Rate | (g/hr) | 0 | 128 | 0 | 9 | 9 | 15 |
| Position of Feedstock and Steam Introduced | | | | | | | |
| Distance from Position (L) | (mm) | 30 | 30 | 30 | 30 | 150 | 150 |
| (L)/(D) | | 0.15 | 0.15 | 0.15 | 0.15 | 0.75 | 0.75 |
| Steam Rate Introduced | (kg/hr) | 30 | 50 | 70 | 50 | 85 | 200 |
| Steam/Feedstock | (% wt) | 1.7 | 2.8 | 3.9 | 2.7 | 5.2 | 12.6 |
| Nitrogen Sp. Sur. Area | (m²/g) | 22.3 | 22.5 | 19.1 | 18.0 | 26.1 | 29.8 |
| Iodine Adsorption No. | (mg/g) | 22.6 | 18.2 | 17.1 | 11.5 | 25.6 | 32.8 |
| DBP Absorption No. | (cc/100 g) | 100.6 | 60.4 | 79.0 | 89.2 | 84.3 | 81.2 |
| Compressed DBP | (cc/100 g) | 71.7 | 56.2 | 60.5 | 65.7 | 63.9 | 64.6 |
| Limit Specific Surface Area | (m²/g) | 24.9 | 36.5 | 33.2 | 29.4 | 30.7 | 30.2 |
| Limit Specific Surface Area Index | (m²/g) | −2.6 | −14.0 | −14.1 | −11.4 | −4.6 | −0.4 |

TABLE 3

| Contrast Examples | | CE1 | CE2 | CE3 |
|---|---|---|---|---|
| Combustion Air Rate | (Nm³/hr) | 3530 | 3170 | 3170 |
| Fuel Rate | (kg/hr) | 80 | 70 | 70 |
| Feedstock Rate | (kg/hr) | 1870 | 1760 | 1800 |
| Potassium Rate | (g/hr) | 27 | 3408 | 12150 |
| Position of Feedstock and Steam Introduced | | | | |
| Distance from Position (L) | (mm) | NA | NA | NA |
| (L)/(D) | | NA | NA | NA |
| Steam Rate Introduced | (kg/hr) | 0 | 0 | 0 |
| Steam/Feedstock | (% wt) | 0 | 0 | 0 |
| Nitrogen Sp. Sur. Area | (m²/g) | 26.5 | 40.6 | 44.2 |
| Iodine Adsorption No. | (mg/g) | 22.9 | 38.2 | 36.7 |
| DBP Absorption No. | (cc/100 g) | 106.5 | 78.3 | 76.0 |
| Compressed DBP | (cc/100 g) | 73.7 | 67.8 | 67.0 |
| Limit Specific Surface Area | (m²/g) | 23.4 | 27.8 | 28.4 |
| Limit Specific Surface Area Index | (m²/g) | 3.1 | 12.8 | 15.8 |

NA = Not Applicable

As shown in case of contrast examples, difference from nitrogen specific surface area to limit specific surface area is positive because limit specific surface area is possible minimum value as specific surface area for conventional furnace black, and it means also the smaller absolute value of the difference the closer to limit of the reactor operation conditions. Then, the difference is defined as limit specific surface area index by means of the following equation (2):

[Limit Specific Surface Area Index]=[Nitrogen Specific Surface Area]−[Limit Specific Surface Area]   Equation (2)

When limit specific surface area and limit specific surface area index of actual examples are calculated using equations (1) and (2), all of limit specific surface area indices are negative. This means that by the introduction of steam, carbon blacks having lower specific surface areas than the minimum Limit Specific Surface Area of the reactor adopted are obtained, and it is obvious that the present invention is very effective to produce carbon blacks having low specific surface area.

Since, in the case of the actual examples, the absolute value of Limit Specific Surface Area index demonstrates directly the effect of steam introduction on restraint of specific surface area, it proves, for instance referring to actual examples, that the introduction of about 3% steam can restrain specific surface area at least by about 14 $m^2/g$ or more.

Adopting the method of the present invention, as shown in actual example 4 of Table 2, carbon blacks having specific surface areas as low as that of thermal black, which has been regarded as difficult to produce by conventional furnace process, are able to be manufactured. Furthermore, these blacks have much higher structure than thermal black and have characteristics which cannot be found in conventional furnace black.

EXAMPLE II

This Example illustrates the process of the present invention wherein L/D equals 0, in comparison to processes without steam introduction.

Experiments were conducted in a reactor typical of the type utilized in conventional carbon black production processes and similar in configuration to the reactor depicted in FIG. 1. The diameter of throat (D) where feedstock was introduced was 50.8 millimeters (mm). Feedstock was introduced through three tips 0.838 mm in diameter located in orifices spaced evenly around the outer periphery of the throat In the runs where steam was introduced, the steam was introduced through a sheath annulus surrounding each feedstock injection tip. As will be noted, however, this is merely exemplary and is not intended to be limiting of the methods usable for introducing steam.

The effluent was quenched through the use of a quench located 5.44 meters from the point of feedstock introduction.

Primary properties of fuel and feedstock employed are listed in Table 4. Potassium ion aqueous solution as alkali metal ion for structure control is added to feedstock both for actual and contrast examples.

TABLE 4

FUEL AND FEEDSTOCK ADOPTED

|  | FUEL | FEEDSTOCK |
|---|---|---|
| Type | Natural Gas | Liquid Hydrocarbon |
| Density(15° C.) [g/cm³] | 0.583 | 1.105 |
| Viscosity (50° C.) [c St] | Not Available | 130.0 (estimated) |
| C-atom [wt %] | 73.1 | 90.6 |
| H-atom [wt %] | 23.8 | 7.5 |
| Total Calorific Value [kcal/kg] | 12800 | 9700 |

The results of the experimental runs are shown in Table 5, which includes two runs exemplary of the process of the present invention wherein L/D=0 and one control run without steam introduction.

TABLE 5

| Examples |  | CE4 | 7 | 8 |
|---|---|---|---|---|
| Combustion Air Rate | (Nm³/hr) | 375 | 375 | 375 |
| Comb. Air Preheat | ° C. | 482 | 482 | 482 |
| Fuel Rate | (kg/hr) | 12.2 | 12.2 | 12.2 |
| Feedstock Rate | (kg/hr) | 115.7 | 115.7 | 115.7 |
| Primary Combusion | % | 250 | 250 | 250 |
| Overall Combustion | % | 28 | 28 | 28 |
| Position of Feedstock and Steam Introduced | | | | |
| Distance from Position (L) | (mm) | 0 | 0 | 0 |
| (L)/(D) |  | 0 | 0 | 0 |
| Steam Rate Introduced | (kg/hr) | 0 | 4.5 | 13.5 |
| Steam/Feedstock | (% wt) | 0 | 3.9 | 11.7 |
| Nitrogen Sp. Sur. Area | (m²/g) | 74.9 | 63.3 | 57.3 |
| Iodine Adsorption No. | (mg/g) | 77.7 | 62.3 | 55.6 |
| DBP Absorption No. | (cc/100 g) | 131.9 | 121.1 | 115.0 |

As shown in Table 5, introduction of steam, according to the process of the present invention wherein L/D=0, results in carbon blacks having reduced surface area and reduced structure. The reduction in surface area is shown by Example Runs 7 and 8, of the process of the present invention, having decreased $N_2$ Surface Areas and Iodine Adsorption Nos. in comparison to contrast example 4 (CE 4) wherein no steam was introduced. The reduction in structure is shown by Example Runs 7 and 8, of the process of the present invention, having decreased DBP Absorption Nos. in comparison to contrast example 4 (CE 4) wherein no steam was introduced.

As also shown in Table 5, by a comparison of the results for Example Runs 7 and 8 of the process of the present invention, increasing the rate of steam introduction, results in a greater decrease in surface area and structure.

It should be clearly understood that the forms of the present invention herein described are illustrative only and are not intended to limit the scope of the invention.

What is claimed is:

1. A process for producing carbon black in a carbon black furnace reactor comprising:

generating a combustion gas steam by reacting a fuel and an oxidant;

introducing a carbon black-yielding feedstock into the combustion gas stream at a point located in a zone of the reactor having a diameter, D;

introducing steam into the combustion gas stream in a first zone of the reactor having a first diameter and at a point located a distance, L, from the point of feedstock introduction such that the ratio of L/D ranges from 0 to less than 1.0, and in an amount such that, after allowing reaction of the feedstock, steam and combustion gas stream, carbon black is produced having a lower nitrogen specific surface area than carbon black made under the same conditions but in the absence of steam;

reacting the feedstock, steam and combustion gas stream to form carbon black in a second lone of the reactor having a diameter that is greater than said first diameter; and cooling, separating and recovering the carbon black.

2. The process of claim 1 wherein the amount of the steam ranges from 1% by weight to 15% by weight of the feedstock.

3. The process of claim 1, wherein the amount of steam introduced is from 1% by weight to 3.9% by weight based on the weight of the feedstock oil introduced.

4. A process for producing carbon black in a carbon black furnace reactor comprising:

generating a combustion gas stream by reacting a fuel and an oxidant;

introducing a carbon black-yielding feedstock into the combustion gas stream at a point located in a transition zone of the reactor, said transition zone having a constant diameter, D;

introducing steam into the combustion gas stream in the transition zone at a point located a distance, L, from the point of feedstock introduction such that the ratio of L/D ranges from 0 to less than 1.0, and in an amount such that, after allowing reaction of the feedstock, steam and combustion gas stream, carbon black is produced having a lower nitrogen specific surface area than carbon black made under the same conditions but in the absence of steam;

reacting the feedstock, steam and combustion gas stream in a zone of the reactor having a diameter that is greater than the diameter of the transition zone; and cooling, separating and recovering the carbon black.

5. A process for producing carbon black in a carbon black furnace reactor comprising:

generating a combustion gas stream by reacting a fuel and an oxidant;

introducing a carbon black-yielding feedstock into the combustion gas stream at a point located in a zone of the reactor having a diameter, D;

introducing steam into the combustion gas stream in a first zone of the reactor having a first diameter and at a point located a distance, L[] from the point of feedstock introduction such that the ratio of L/D is 0, and in an amount such that, after allowing reaction of the feedstock, steam and combustion gas stream, carbon black is produced having a lower nitrogen specific surface area than a carbon black made under the same conditions but in the absence of said steam;

reacting the feedstock, steam and combustion gas stream to form carbon black in a second lone of the reactor having a diameter that is greater than said first diameter; and cooling, separating and recovering the carbon black.

6. The process of claim 5, wherein the amount of steam introduces is from 1% by weight to 3.9% by weight based on the weight of the feedstock oil introduced.

7. The process of claim 1, wherein the nitrogen specific surface area of the carbon black is restrained by at least about 14 m²/g.

8. The process of claim 1, wherein the difference from the nitrogen specific surface area to the limited specific surface area of the carbon black is negative.

9. A process for restraining an increase in the specific surface area of carbon black formed in a carbon black furnace reactor comprising:

generating a combustion gas stream by reacting a fuel and an oxidant;

introducing a carbon black-yielding feedstock into the combustion gas stream at a point located in a zone of the reactor having a diameter, D;

introducing steam into the combustion gas stream in a first lone of the reactor having a first diameter and at a point located a distance, L, from the point of feedstock introduction such that the ratio of L/D ranges from 0 to less than 1.0, and in an amount such that, after allowing reaction of the feedstock, steam and combustion gas stream, carbon black is produced having a lower nitrogen specific surface area than a carbon black made under the same conditions but in the absence of steam;

reacting the feedstock, steam and combustion gas stream to form carbon black in a second lone of the reactor having a diameter that is greater than said first diameter; and cooling, separating and recovering the carbon black.

10. The process of claim 9, wherein the nitrogen specific surface area is restrained by at least about 14 m²/g.

11. The process of claim 9, wherein the difference from the nitrogen specific surface area to the limited specific surface area of the carbon black is negative.

12. The process of claim 5, wherein the amount of steam introduces ranges from 1% by weight to 15% by weight of the feedstock.

13. The process of claim 9, wherein the amount of steam introduces is from 1% by weight to 3.9% by weight based on the weight of the feedstock oil introduced.

14. A process for producing carbon black in a carbon black furnace reactor comprising:

generating a combustion gas stream by reacting a fuel and an oxidant;

introducing a carbon black-yielding feedstock into the combustion gas stream at a point located in a zone of the reactor having a diameter, D;

introducing steam into the combustion gas stream at a point upstream of the point of feed stock introduction at a distance, L from the point of feedstock introduction such that the ratio of L/D ranges from 0 to less than 1.0;

allowing reaction of the feedstock, steam and combustion gas stream to form carbon black; and cooling, separating and recovering the carbon black.

15. The process of claim 14, wherein the amount of steam introduced ranges from 1% by weight to 15% by weight based on the weight of the feedstock.

16. A process for producing carbon black in a carbon black furnace reactor comprising:

generating a combustion gas stream by reacting a fuel and an oxidant;

introducing a carbon black-yielding feedstock into the combustion gas stream at a point located in a transition zone of the reactor, said transition zone having a constant diameter, D;

introducing steam into the combustion gas stream in the transition zone at a point located a distance, L, from the point of feedstock introduction such that the ratio of L/D is 0, and in an amount such that, after allowing reaction of the feedstock, steam and combustion gas stream, carbon black is produced having a lower nitrogen specific surface area than a carbon black made under the same conditions but in the absence of said steam;

reacting the feedstock, steam and combustion gas stream to form carbon black in a second zone of the reactor having a diameter that is greater than the diameter of the transition zone; and cooling, separating and recovering the carbon black.

* * * * *